(12) United States Patent
Todd et al.

(10) Patent No.: US 10,956,377 B2
(45) Date of Patent: Mar. 23, 2021

(54) DECENTRALIZED DATA MANAGEMENT VIA GEOGRAPHIC LOCATION-BASED CONSENSUS PROTOCOL

(71) Applicant: EMC IP Holding Company LLC, Hopkinton, MA (US)

(72) Inventors: Stephen J. Todd, Center Conway, NH (US); Assaf Natanzon, Tel Aviv (IL); Said Tabet, Sherborn, MA (US); Dragan Savic, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 223 days.

(21) Appl. No.: 16/033,339

(22) Filed: Jul. 12, 2018

(65) Prior Publication Data

US 2020/0019626 A1 Jan. 16, 2020

(51) Int. Cl.
*G06F 16/00* (2019.01)
*G06F 16/182* (2019.01)
(Continued)

(52) U.S. Cl.
CPC ...... *G06F 16/1837* (2019.01); *G06F 16/1805* (2019.01); *G06F 16/27* (2019.01);
(Continued)

(58) Field of Classification Search
CPC ...... G06F 16/1837; G06F 16/27; G06F 16/29; G06F 16/1805; H04L 9/0861; H04L 2209/38
See application file for complete search history.

(56) References Cited

U.S. PATENT DOCUMENTS 9,021,296 B1 * 4/2015 Kiselev .................. G06F 16/21
714/6.23
9,699,017 B1 * 7/2017 Gupta ..................... H04L 29/08
(Continued)

OTHER PUBLICATIONS

Outchakoucht et al. "Dynamic Access Control Policy based on Blockchain and Machine Learning for the Internet of Things", 2017, (IJACSA) International Journal of Advanced Computer Science and Applications, vol. 8, No. 7, 2017 (Year: 2017).*
(Continued)

*Primary Examiner* — Polina G Peach
(74) *Attorney, Agent, or Firm* — Ryan, Mason & Lewis, LLP (57) ABSTRACT

Techniques are disclosed for decentralized data management using a geographic location-based consensus protocol in a network of computing resources such as, by way of example, a highly distributed system. For example, at a given consensus node of a consensus network comprising a plurality of consensus nodes configured to participate in a consensus protocol wherein at least a portion of the consensus nodes are mobile, a list is obtained of at least a subset of the plurality of consensus nodes that are predicted to be currently available to participate in the consensus protocol based on geographic location information. A message comprising a transaction to be validated is sent from the given consensus node to the subset of the plurality of consensus nodes in the obtained list. Techniques are also disclosed for adjusting a data protection policy based on the number of computing nodes, some of which are mobile, available to participate.

20 Claims, 8 Drawing Sheets

(51) Int. Cl.
*H04L 9/08* (2006.01)
*G06F 16/27* (2019.01)
*G06F 16/29* (2019.01)
*G06F 16/18* (2019.01)
*G06F 16/30* (2019.01)

(52) U.S. Cl.
CPC ............ *G06F 16/29* (2019.01); *H04L 9/0861* (2013.01); *H04L 2209/38* (2013.01)

(56) References Cited

U.S. PATENT DOCUMENTS

| | | | | |
|---|---|---|---|---|
| 10,089,607 | B2* | 10/2018 | Ziat ..................... | G06Q 20/401 |
| 10,097,344 | B2* | 10/2018 | Davis ................... | H04L 9/0643 |
| 10,102,526 | B1* | 10/2018 | Madisetti ............. | H04L 9/3239 |
| 10,129,694 | B1* | 11/2018 | Parshin ................. | H04L 67/18 |
| 10,366,106 | B2* | 7/2019 | Fan ...................... | H04L 67/1002 |
| 10,452,681 | B1* | 10/2019 | Chen .................... | G06F 16/955 |
| 10,579,424 | B2* | 3/2020 | Goel ..................... | H04L 9/3247 |
| 10,839,345 | B2* | 11/2020 | Antor ................... | G06F 21/64 |
| 2002/0059528 | A1* | 5/2002 | Dapp ................... | H04L 63/0272 726/23 |
| 2004/0172421 | A1* | 9/2004 | Saito .................... | G06F 16/184 |
| 2010/0262717 | A1* | 10/2010 | Critchley ............. | H04L 61/1541 709/251 |
| 2011/0041136 | A1* | 2/2011 | Messier ................. | G06F 9/5066 718/105 |
| 2014/0007236 | A1* | 1/2014 | Krueger ................ | G06F 21/566 726/23 |
| 2014/0304231 | A1* | 10/2014 | Kamath ................. | G06F 16/27 707/634 |
| 2015/0296404 | A1* | 10/2015 | Sharma ................. | H04W 4/70 370/230 |
| 2016/0027229 | A1* | 1/2016 | Spanos .................. | G07C 13/00 705/51 |
| 2017/0180211 | A1* | 6/2017 | Johnson ................ | H04L 41/5009 |
| 2017/0221288 | A1* | 8/2017 | Johnson ................ | G07C 9/257 |
| 2017/0272342 | A1* | 9/2017 | Zessin ................... | H04L 41/12 |
| 2017/0285720 | A1* | 10/2017 | Shah ..................... | G06Q 20/065 |
| 2017/0344435 | A1* | 11/2017 | Davis ................... | G06F 16/9535 |
| 2018/0013211 | A1* | 1/2018 | Ricci .................... | G07C 5/0816 |
| 2018/0020324 | A1* | 1/2018 | Beauford .............. | H04L 43/10 |
| 2018/0039667 | A1* | 2/2018 | Pierce .................. | G06F 16/2379 |
| 2018/0063238 | A1* | 3/2018 | Zhang .................. | G06F 11/1425 |
| 2018/0113752 | A1* | 4/2018 | Derbakova ........... | G06Q 40/025 |
| 2018/0212866 | A1* | 7/2018 | Kumar .................. | H04L 45/22 |
| 2018/0268401 | A1* | 9/2018 | Ortiz .................... | G06Q 20/204 |
| 2018/0337695 | A1* | 11/2018 | Frankel ................ | H04L 67/1097 |
| 2019/0012662 | A1* | 1/2019 | Krellenstein .......... | G06Q 40/04 |
| 2019/0089717 | A1* | 3/2019 | Dolev ................... | G06F 16/9535 |
| 2019/0149417 | A1* | 5/2019 | Augusto Lopes .. | H04L 41/0886 370/254 |
| 2019/0173739 | A1* | 6/2019 | Cui ....................... | H04L 41/04 |
| 2019/0208422 | A1* | 7/2019 | Haleem ................ | G06F 16/1824 |
| 2019/0236562 | A1* | 8/2019 | Padmanabhan ..... | H04L 67/1095 |
| 2019/0238525 | A1* | 8/2019 | Padmanabhan ..... | G06F 21/6245 |
| 2019/0253240 | A1* | 8/2019 | Treat .................... | H04L 9/0637 |
| 2019/0318338 | A1* | 10/2019 | Verma .................. | H04L 9/0637 |
| 2019/0334957 | A1* | 10/2019 | Davis ................... | H04L 65/403 |
| 2019/0342078 | A1* | 11/2019 | Li .......................... | H04L 9/0643 |
| 2019/0349426 | A1* | 11/2019 | Smith ................... | H04L 67/104 |
| 2019/0354397 | A1* | 11/2019 | Goel .................... | G06Q 20/02 |
| 2019/0354962 | A1* | 11/2019 | Spector ................ | G06F 16/9024 |
| 2019/0386995 | A1* | 12/2019 | Chafe .................. | G06Q 20/3678 |
| 2020/0013045 | A1* | 1/2020 | Spalding .............. | G06Q 20/36 |
| 2020/0145194 | A1* | 5/2020 | Stollery ................ | G06Q 20/36 |

OTHER PUBLICATIONS

Wong et al. "Octant: A Comprehensive Framework for the Geolocalization of Internet Hosts", 2007, Conference: 4th Symposium on Networked Systems Design and Implementation (NSDI 2007), Apr. 11-13, 2007, Cambridge, Massachusetts, USA, Proceedings (Year: 2007).*
AbdelRahman Abdou et al., "CPV: Delay-based Location Verification for the Internet", Jun. 30, 2015, IEEE (Year: 2015).*
U.S. Appl. No. 15/730,990, filed in the name of Stephen Todd et al. on Oct. 12, 2017 and entitled "Data Management for Extended Multi-Cloud Environment.".
U.S. Appl. No. 15/959,421, filed in the name of Stephen J. Todd et al. on Apr. 23, 2018 and entitled "Decentralized Data Management Across Highly Distributed Systems.".
Satoshi Nakamoto, "Bitcoin: A Peer-to-Peer Electronic Cash System," https://bitcoin.org/en/bitcoin-paper, Oct. 31, 2008, 9 pages.
Juan Benet, "IPFS—Content Addressed, Versioned, P2P File System (Draft 3)," arXiv:1407.3561v1,Jul. 14, 2014, 11 pages.
U.S. Appl. No. 15/898,443, filed in the name of Kelly G. Kanellakis et al. on Feb. 17, 2018 and entitled "Ad-Hoc Mobile Computing.".

* cited by examiner

| 602 | OBTAIN, AT A GIVEN CONSENSUS NODE OF A CONSENSUS NETWORK COMPRISING A PLURALITY OF CONSENSUS NODES CONFIGURED TO PARTICIPATE IN A CONSENSUS PROTOCOL WHEREIN AT LEAST A PORTION OF THE CONSENSUS NODES ARE MOBILE, A LIST OF AT LEAST A SUBSET OF THE PLURALITY OF CONSENSUS NODES THAT ARE PREDICTED TO BE CURRENTLY AVAILABLE TO PARTICIPATE IN THE CONSENSUS PROTOCOL BASED ON GEOGRAPHIC LOCATION INFORMATION |
|---|---|
| 604 | SEND A MESSAGE COMPRISING A TRANSACTION TO BE VALIDATED FROM THE GIVEN CONSENSUS NODE TO THE SUBSET OF THE PLURALITY OF CONSENSUS NODES IN THE OBTAINED LIST, WHEREIN THE GIVEN CONSENSUS NODE APPENDS ITS GEO-LOCATION INFORMATION TO THE MESSAGE SENT TO THE SUBSET OF THE PLURALITY OF CONSENSUS NODES IN THE OBTAINED LIST |

DECENTRALIZED DATA MANAGEMENT VIA GEOGRAPHIC LOCATION-BASED CONSENSUS PROTOCOL

FIELD

The field relates generally to networks of computing resources, and more particularly to techniques for data management in such networks of computing resources.

BACKGROUND

Enterprises or other entities typically have a large information technology (IT) infrastructure comprising a network of computing resources distributed across a geographic environment. In many scenarios, these computing resources are mobile and may be referred to as mobile compute platforms. These mobile compute platforms, along with servers that communicate with the mobile compute platforms, collectively form a highly distributed system. Mobile compute platforms may be in a variety of forms including, but not limited to, employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

It is often necessary to transfer data sets to these mobile compute platforms, many of which are continuously moving. However, data management in such highly distributed systems can be very challenging.

SUMMARY

Embodiments of the invention provide techniques for decentralized data management using a geographic location-based consensus protocol in a network of computing resources such as, by way of example, a highly distributed system.

For example, in one or more illustrative embodiments, a method comprises the following steps. At a given consensus node of a consensus network comprising a plurality of consensus nodes configured to participate in a consensus protocol wherein at least a portion of the consensus nodes are mobile, a list is obtained of at least a subset of the plurality of consensus nodes that are predicted to be currently available to participate in the consensus protocol based on geographic location information. A message comprising a transaction to be validated is sent from the given consensus node to the subset of the plurality of consensus nodes in the obtained list.

The given consensus node, in one or more illustrative embodiments, appends its geographic location information to the message sent to the subset of the plurality of consensus nodes in the obtained list. Further, in one or more illustrative embodiments, the geographic location information comprises actual geographic coordinates associated with a given consensus node, as well as information used to predict geographic location such as information identifying a route the given consensus node is traveling, information identifying a direction and a speed at which the given consensus node is traveling, and information identifying a time at which the geographic location information was captured.

In one or more illustrative embodiments, the plurality of consensus nodes operates in a system environment maintaining a decentralized messaging network of interconnected messaging nodes and a decentralized data network of interconnected data nodes, wherein each of the consensus nodes is associated with a given messaging node and a given data node.

In one or more illustrative embodiments, a consensus node map is maintained identifying the geographic location of consensus nodes in the consensus network such that the consensus node map is consulted to generate the list of at least a subset of the plurality of consensus nodes that are predicted to be currently available to participate in the consensus protocol. The given consensus node locally maintains the consensus node map, in one or more illustrative embodiments, based on geographic location information in one or more messages received from one or more other consensus nodes in the consensus network.

Further, in one or more illustrative embodiments, the given consensus node has an application program associated therewith such that the application program is given access to the consensus node map of the consensus network. The application program is configured to alter a data protection policy based on a current state of the consensus network determined from the consensus node map.

Still further, in another illustrative embodiment, a method obtains, at a given computing node of a computing network comprising a plurality of computing nodes wherein at least a portion of the computing nodes are mobile, a list of at least a subset of the plurality of computing nodes that are predicted to be currently available to participate in a data protection policy. The data protection policy is selected based on the number of available computing nodes. The selected data protection policy is upgraded or downgraded as the number of available computing nodes changes.

Advantageously, some illustrative embodiments utilize decentralized data management techniques using a geographic location-based consensus protocol to optimize data movement and management during transfers of data sets to a continuously moving set of compute platforms by transferring messages and/or data to compute platforms that are likely to be responsive. Still further, some illustrative embodiments adjust a data protection policy based on the number of available mobile compute platforms that are available to participate.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

Illustrative embodiments provide techniques for decentralized data management using a geographic location-based consensus protocol in an information processing system comprising a plurality of mobile compute platforms. Such mobile compute platforms comprise one or more mobile computing resources. The term "computing resource," as illustratively used herein, can refer to any device, endpoint, component, element, or other resource, that is capable of performing processing and/or storage functions and is capable of communicating with the system. As mentioned above, non-limiting examples of such mobile compute platforms include employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

Figure 1A:
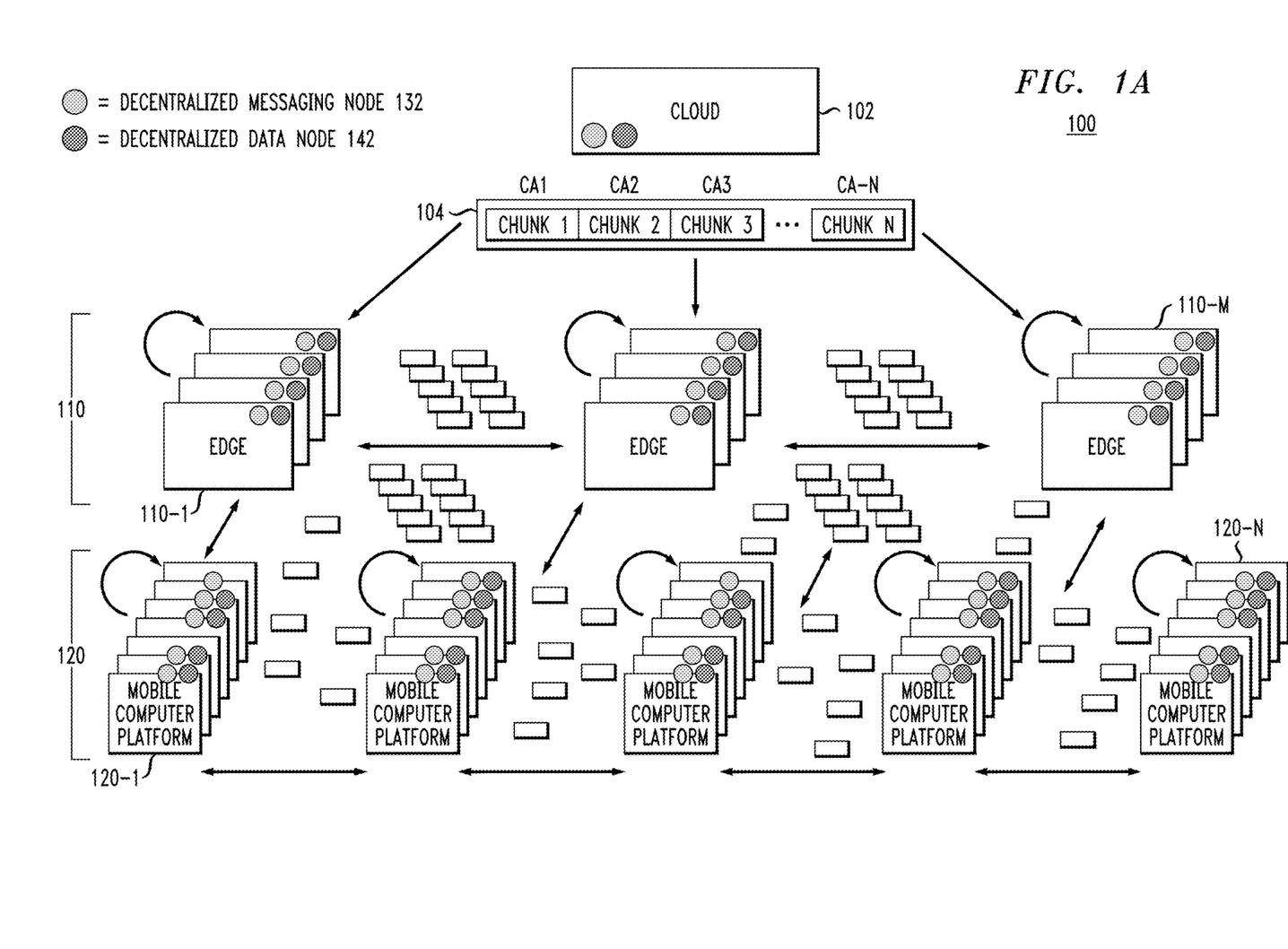
FIG. 1A illustrates a highly distributed system environment with decentralized messaging network and decentralized data network overlays with which one or more illustrative embodiments are implemented.

An information processing system that comprises such diverse and distributed computing resources, at least some of which are mobile, is illustratively referred to herein as a highly distributed system. An example of a highly distributed system environment is shown in FIG. 1A with further details shown in FIGS. 1B and 1C. Thus, before describing a geographic location-based consensus protocol according to illustrative embodiments, a highly distributed system within which such illustrative embodiments can be implemented is described in the context of FIGS. 1A through 1C.

As shown in FIG. 1A, highly distributed system environment 100 comprises a cloud platform 102 that contains a data set 104 that the cloud platform seeks to push out, through an intermediary layer 110 with a plurality of edge servers 110-1 through 110-M, to computing resources in a bottom layer 120 that are part of a plurality of mobile compute platforms (MCPs) 120-1 through 120-N. Note that the cloud platform 102 and the edge servers 110-1 through 110-M may be considered computing resources as well. Also, while the intermediary layer 110 comprises stationary computing resources and the bottom layer 120 comprises mobile computing resources, it is to be understood that in some embodiments one or more of the two layers 110 and 120 comprise a mix of stationary and mobile computing resources. Further, the cloud platform 102 may comprise a public cloud or a private cloud. Examples of public clouds may include, but are not limited to, Amazon Web Services® (AWS), Google Compute Engine® (GCE), and Windows Azure® Services platforms. The highly distributed system environment may employ heterogeneous and varied network connections, from carrier-grade service level agreement (SLA)-capable networks to torrent-like, peer-to-peer networks.

Highly distributed system environment 100 in FIG. 1A illustratively represents a variety of use cases in which frequent downloads of massive data sets occur to MCPs. For example, it may be necessary or desired to download a large data set to a set of MCPs comprising passenger vehicles, drones, shipping vehicles, employee devices, etc. It is to be appreciated that many of these MCP devices are compute-constrained (e.g., configured with limited processing capabilities, as well as with limited storage, network, and other resource-related capabilities). The data being transferred may represent any kind of data, by way of example only, new software downloads, navigation maps, customer information, weather pattern data, etc. Note that while the illustrative descriptions herein relate to data download use cases (i.e., data transferring from the cloud platform 102 to MCPs 120-1 through 120-N), the same architecture shown in highly distributed system environment 100 may be used for data upload use cases (i.e., data transferring from MCPs 120-1 through 120-N to the cloud platform 102) as well.

Furthermore, note that the highly distributed system environment 100 also illustrates decentralized messaging network and decentralized data network overlays. Such overlays comprise a decentralized messaging network (130 in FIG. 1B) of decentralized messaging nodes (DMNs) 132 and a decentralized data network (140 in FIG. 1C) of decentralized data nodes (DDNs) 142, as will be further explained. More particularly, as shown, cloud platform 102, each of edge servers 110-1 through 110-M, and each of MCPs 120-1 through 120-N comprise a DMN 132 and a DDN 142. The network of DMNs 132 are interconnected to form the decentralized messaging network 130 as illustratively shown in FIG. 1B, while the network of DDNs 142 are interconnected to form the decentralized data network 140 as illustratively shown in FIG. 1C.

It is to be appreciated that, in alternative embodiments, cloud platform 102, one or more of edge servers 110-1 through 110-M, and/or one or more of MCPs 120-1 through 120-N may not necessarily participate in the decentralized messaging network and/or the decentralized data network, and thus do not have a DMN 132 and/or a DDN 142 associated therewith.

In one illustrative embodiment, the decentralized messaging network 130 and the decentralized data network 140 can be implemented via decentralized message passing and decentralized shared data namespace approaches described in U.S. Ser. No. 15/730,990, filed on Oct. 12, 2017 and entitled "Data Management for Extended Multi-Cloud Environment," and U.S. Ser. No. 15/959,421, filed on Apr. 23, 2018 and entitled "Decentralized Data Management Across Highly Distributed Systems," the disclosures of which are incorporated by reference herein in their entireties. However, it is to be understood that the decentralized messaging network 130 and the decentralized data network 140 can be implemented using alternative approaches and overlay architectures.

In one or more illustrative embodiments, the DMNs 132 of decentralized messaging network 130 may be blockchain nodes operatively coupled to form a distributed ledger system. As used herein, the terms "blockchain," "digital ledger" and "blockchain digital ledger" may be used interchangeably. As is known, the blockchain or digital ledger protocol is implemented via a distributed, decentralized computer network of compute nodes (e.g., DMNs 132). The compute nodes are operatively coupled in a peer-to-peer communications protocol (e.g., as illustratively depicted in FIG. 1B). In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the digital ledger. Typically, for example, the new transaction is broadcast to all nodes within the network, inspected, a consensus is reached, and the entry is formally committed to the blockchain based on whether consensus is reached that the entry is validated.

Figure 1B:
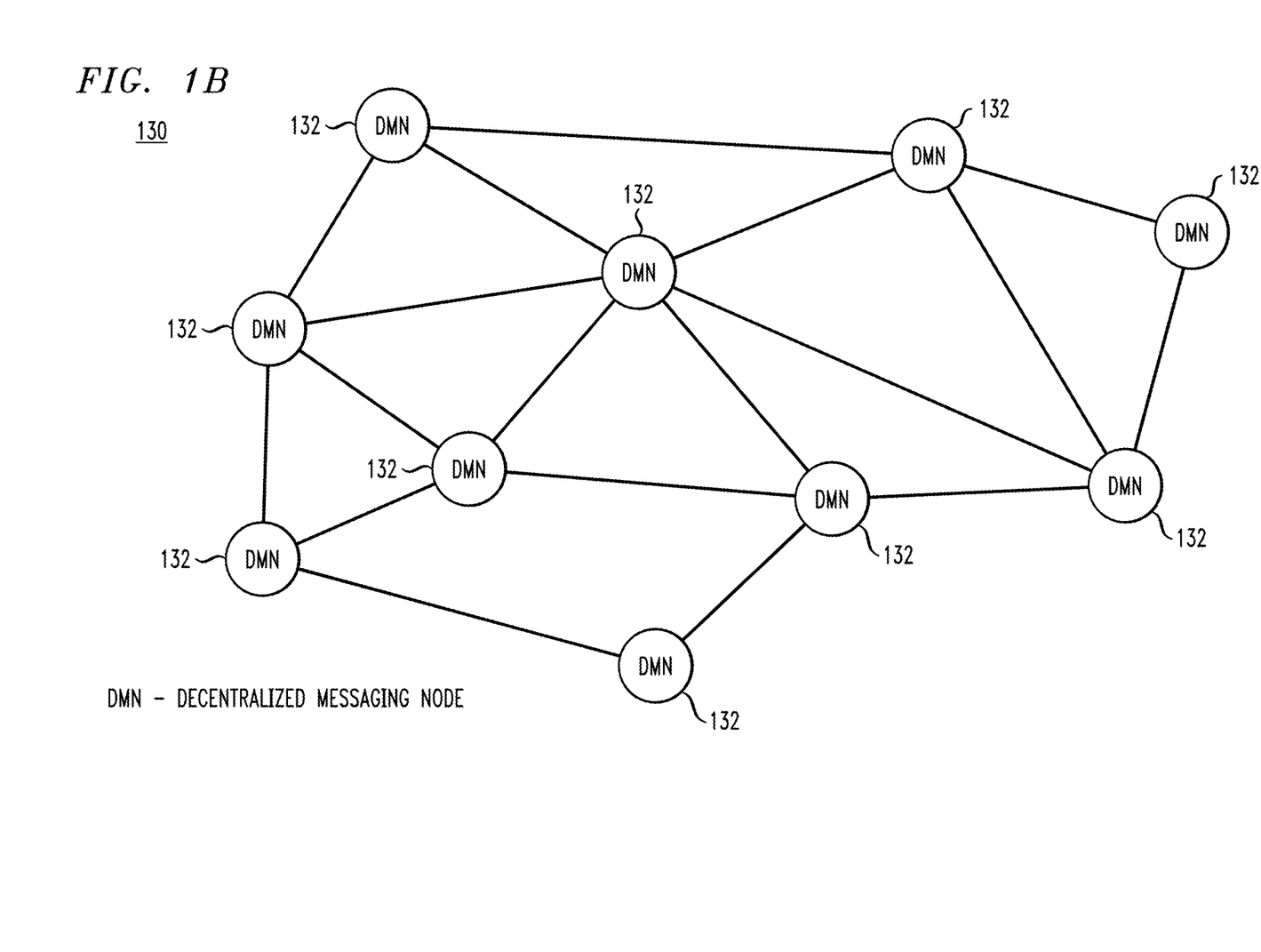
FIG. 1B illustrates a decentralized messaging network with which one or more illustrative embodiments are implemented.

Accordingly, it is to be understood that cloud platform 102, each of edge servers 110-1 through 110-M, and each of MCPs 120-1 through 120-N shown in the environment 100 in FIG. 1A either hosts thereon or is otherwise in communication with at least one of the DMNs 132 in FIG. 1B. That is, cloud platform 102, each of edge servers 110-1 through 110-M, and each of MCPs 120-1 through 120-N are configured to store one or more transactions on the distributed ledger at a corresponding DMN 132 such that the one or more transactions are immutably stored on the distributed ledger and securely accessible by the plurality of DMNs 132 (and thus by cloud platform 102, each of edge servers 110-1 through 110-M, and each of MCPs 120-1 through 120-N). In illustrative embodiments, examples of transactions that can be stored on the distributed ledger include, but are not limited to, messages passed between cloud platform 102, each of edge servers 110-1 through 110-M, and each of MCPs 120-1 through 120-N to effectuate the transfer of data set 104.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 1C:
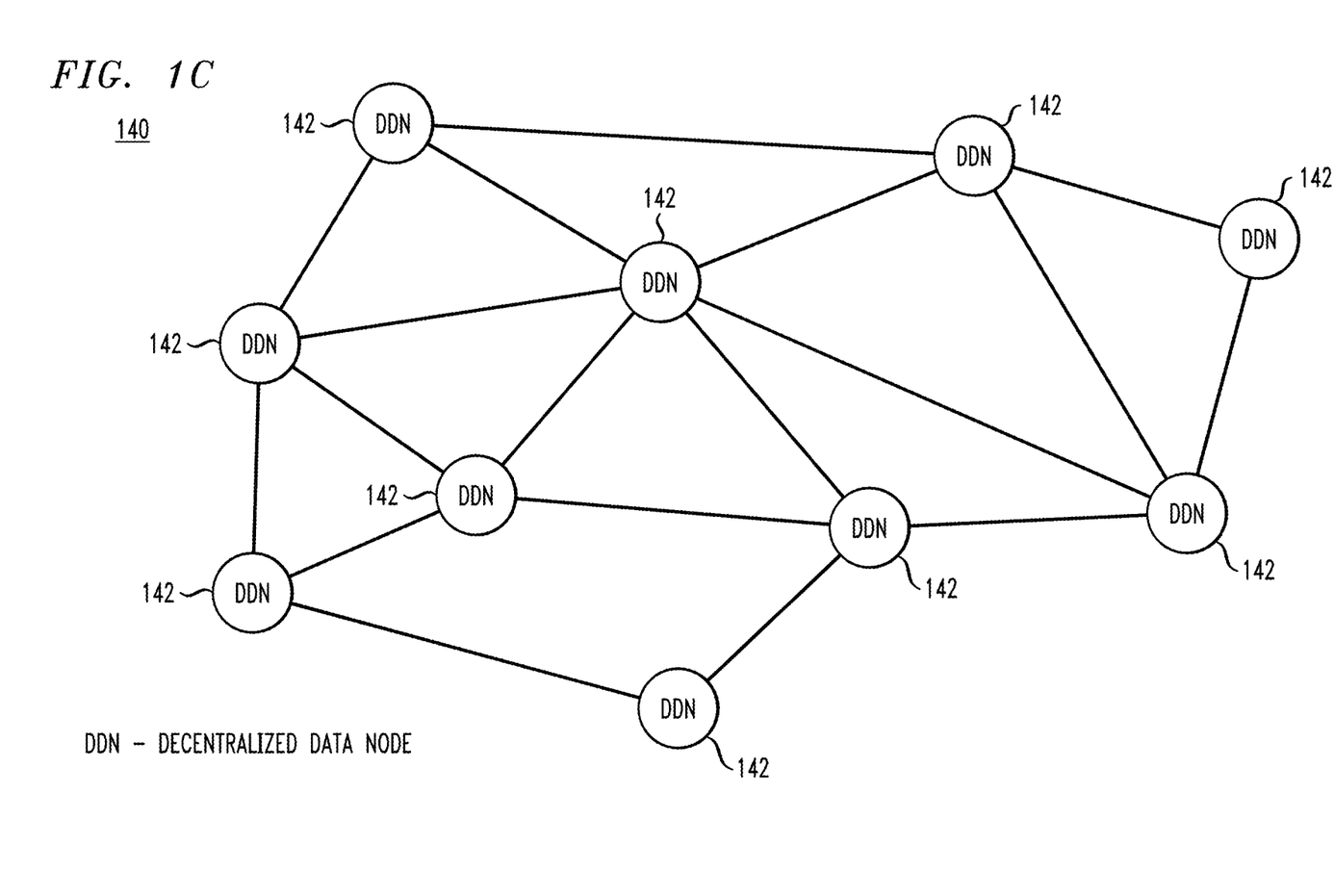
FIG. 1C illustrates a decentralized data network with which one or more illustrative embodiments are implemented.

In one or more illustrative embodiments, the DDNs 142 of decentralized data network 140 may be data sharing nodes operatively coupled to form a data sharing system. For example, such a data sharing system may implement the Interplanetary File System (IPFS) protocol. More particularly, IPFS is an open-source protocol that provides a decentralized method of storing and sharing files relying on a content-addressable, peer-to-peer hypermedia distribution. The compute nodes in an IPFS network form a distributed file system. The IPFS protocol was developed to replace the HyperText Transfer Protocol (HTTP) of the Internet which relies on location addressing (i.e., using Internet Protocol (IP) addresses to identify the specific computing resource that is hosting a desired data set). As such, the subject data set must be retrieved from the computing resource where it originated or some computing resource within the content delivery network (CDN) each time the data set is requested.

IPFS operates by operatively coupling cloud platform 102, each of edge servers 110-1 through 110-M, and each of MCPs 120-1 through 120-N with the same system of files via a system of nodes (e.g., DDNs 142 in FIG. 1C). More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a key-value data store. Any type of content can be inserted into the data sharing system, and the system returns a key (i.e., in the form of a hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In one example, the IPFS system is further described in J. Benet, "IPFS—Content Addressed, Versioned, P2P File System," 2014, the disclosure of which is incorporated by reference herein in its entirety. However, illustrative embodiments are not limited to this particular data sharing system and alternative systems may be employed.

Accordingly, it is to be understood that cloud platform 102, each of edge servers 110-1 through 110-M, and each of mobile compute platforms 120-1 through 120-N shown in system environment 100 in FIG. 1A either hosts thereon or is otherwise in communication with at least one of the DDNs 142 in FIG. 1C. That is, cloud platform 102, each of edge servers 110-1 through 110-M, and each of MCPs 120-1 through 120-N are each configured through their respective DDN 142 to maintain a DHT and to execute the IPFS protocol to retrieve content from one or more other DDNs (and thus from cloud platform 102, each of edge servers 110-1 through 110-M, and each of MCPs 120-1 through 120-N) as needed.

It is to be appreciated that one or more DDNs 142 may be co-located with one or more DMNs 132 such that both node types reside on or are otherwise associated with cloud platform 102, each of edge servers 110-1 through 110-M, and each of MCPs 120-1 through 120-N.

Assume that a large data set, data set 104, needs to be downloaded from cloud platform 102 to a large number (or all) of MCPs 120-1 through 120-N. Note that, in one or more illustrative embodiments, each MCP (120-1 through 120-N) may represent one mobile compute device (e.g., a vehicle, employee computer or tablet, or other mobile device). Further assume that the edge servers 110-1 through 110-M between the cloud platform 102 and the MCPs 120-1 through 120-N do not have enough bandwidth to download a copy to every device, and/or also assume that there may not be enough storage capacity in each device to store the entire file. Thus, the MCPs 120-1 through 120-N receive chunks (CA1, CA2, CA3, CA-N, where N is a number not necessarily equivalent to the number of MCPs) of data set 104.

In accordance with one or more illustrative embodiments, before downloading the file, a cloud operator (associated with cloud platform 102) specifies one or more data management policies in a policy file. These one or more policies instruct the entire system environment 100 how to handle the download and distribution of data set 104 (e.g., the cloud operator specifies a minimum chunk size of the data set to be downloaded and that more be stored if there is enough space on the MCP).

In order for the policy file and data set 104 to be distributed across the entire system environment 100, the DMNs 132 of the decentralized messaging network 130 and the DDNs 142 of the decentralized data network 140 are used. For example, a copy of a policy file can be stored as a file in the IPFS data sharing system (network 140), which is also then used to share the chunks of the data set 104 according to the policy file. The blockchain network (network 130) formed by the DMNs 132 is used to distribute messages between cloud platform 102, each of edge servers 110-1 through 110-M, and each of mobile compute platforms 120-1 through 120-N shown in system environment 100, for example, but not limited to, validation messages used in a consensus protocol.

Given the illustrative architectures described above in the context of FIGS. 1A through 1C, methodologies for managing data set 104 using a geographic location-based consensus protocol according to illustrative embodiments will now be described. It is to be understood that, in a highly distributed system such as system architecture 100 shown in FIG. 1A, the geographic location-based consensus protocol is implemented by the DMNs 132 of decentralized messaging network 130 in FIG. 1B, i.e., blockchain nodes operatively coupled to form a distributed ledger system.

Figure 2:
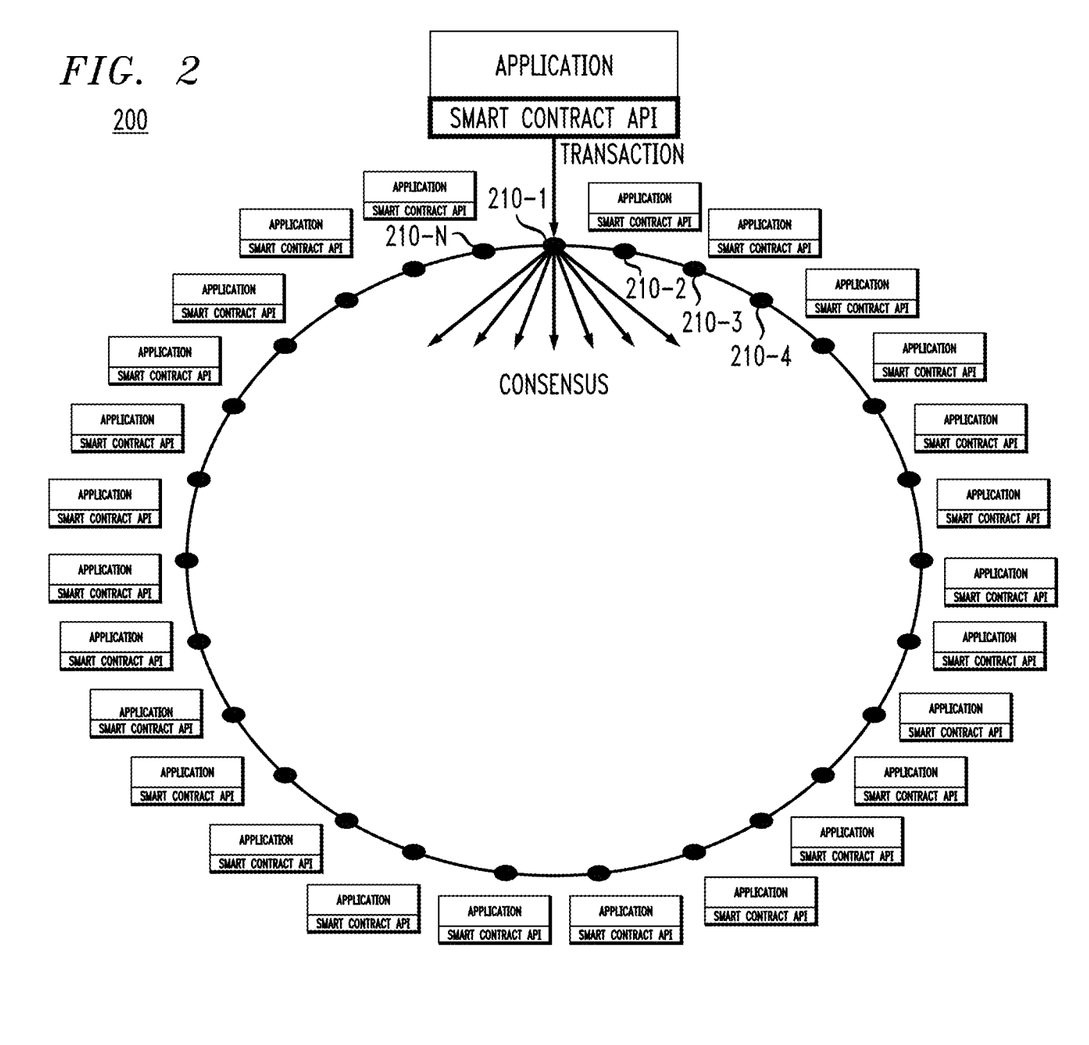
FIG. 2 illustrates consensus broadcasting from a given consensus node to other consensus nodes for a new transaction in a highly distributed system with which one or more illustrative embodiments are implemented.

FIG. 2 illustrates consensus broadcasting from a given consensus node to other consensus nodes in a consensus network 200 for a new transaction in a highly distributed system with which one or more illustrative embodiments are implemented. More particularly, as shown, consensus network 200 comprises a plurality of consensus nodes 210-1 through 210-N. In one or more illustrative embodiments, each of consensus nodes 210-1 through 210-N is a DMN 132 of decentralized messaging network 130. However, in some embodiments, a consensus node also has a DDN 142 associated therewith.

Each consensus node in this illustrative embodiment has an application program ("Application") and an application programming interface ("Smart Contract API") associated therewith. The application program accesses the corresponding consensus node through the API to input or otherwise access transactions (e.g., messages as described above) on the blockchain stored on the consensus node. The term "smart contract" is a reference to the nature of a blockchain transaction requiring consensus prior to being added to the digital ledger, i.e., a digital agreement with characteristics of immutability and enforceability.

Thus, FIG. 2 highlights a transaction being inserted by consensus node 210-1 into the consensus network 200. This transaction is broadcast to the entire network of consensus nodes, i.e., consensus nodes 210-2 through 210-N, and the entire network then inter-communicates (often using all-to-all messaging) to validate the transaction before the transaction is committed to the blockchain. As mentioned, such validation is performed using a consensus algorithm or protocol. That is, the new transaction is broadcast to all consensus nodes within the network 200 and inspected, a consensus is reached between the consensus nodes, and the entry is formally committed to the blockchain based on whether consensus is reached that the entry is validated.

Note that in some typical consensus protocols, consensus nodes are each configured to participate as peers with one peer being designated as a leader. Any peer can assume the role of leader for a given iteration of the consensus protocol. Typically, the leader node sends out a new transaction to one or more of the other peer nodes which each validate the accuracy of the new transaction. If consensus is reached, then the nodes in the network add the new block to the blockchain they currently maintain. As a result, after the new transaction is processed by the consensus network, each node should now have a copy of the same updated blockchain stored in its memory. Then, when a new transaction comes into the network, the above-described process of adding the transaction to the blockchain is repeated. In the context of a consensus protocol, the more nodes that validate the given transaction, the more trustworthy the data block is considered.

While a consensus protocol is critical to decentralized operation, these algorithms suffer when the number of nodes in the consensus network is continually changing. For example, when each node in a consensus network (e.g., consensus nodes 210-1 through 210-N in consensus network 200) represents either a stationary node (e.g., a traffic light or a set of edge servers in layer 110 of FIG. 1A) or a mobile node (e.g., a connected car with an MCP such as in layer 120 of FIG. 1A), the consensus network can experience one or more of the problems outlined below.

Frequent Timeouts.

As consensus nodes move away from each other, their response times may exceed the upper wait times of the issuing node, causing that consensus node to wait frequently and for the overall system to perform slowly.

Continual Re-Elections.

In a near ideal consensus environment, the consensus nodes are fairly stable and do not come and go frequently. However, in practice, when consensus nodes disappear for some reason, there is often a re-election process that occurs to create a new leader with new members. This re-election process can take valuable compute cycles and can impede the progress on validating new transactions coming into the system.

Multi-Phase Commits.

Some consensus algorithms (e.g., Byzantine fault tolerant or BFT algorithms) come to consensus over multiple phases. All of the nodes in a consensus configuration may be working through a first phase but some of them may go out of range before future phases can complete. This also slows down progress for validating transactions.

Sporadic Network Connectivity.

The dynamic nature of an MCP network may result in unreliable transmission of network messages between nodes. Unreliable networks may cause consensus nodes to believe (incorrectly) that other consensus nodes have failed and/or that they have moved out of range.

Data Protection Risks.

Based on the number of connected mobile devices and the health of the consensus network between those consensus nodes, the overall ecosystem may have a healthy set of nearby consensus nodes that can protect data according to a predefined policy, or the environment may be fluctuating so dynamically that compliance with data protection policies may be at risk.

Illustrative embodiments overcome the above and other drawbacks associated with consensus networks and protocols by modifying the underlying consensus network to carry geographic coordinates (and, in some embodiments, route information) in order to allow the consensus network to continue making quick progress on validating new transaction requests.

Figure 3:
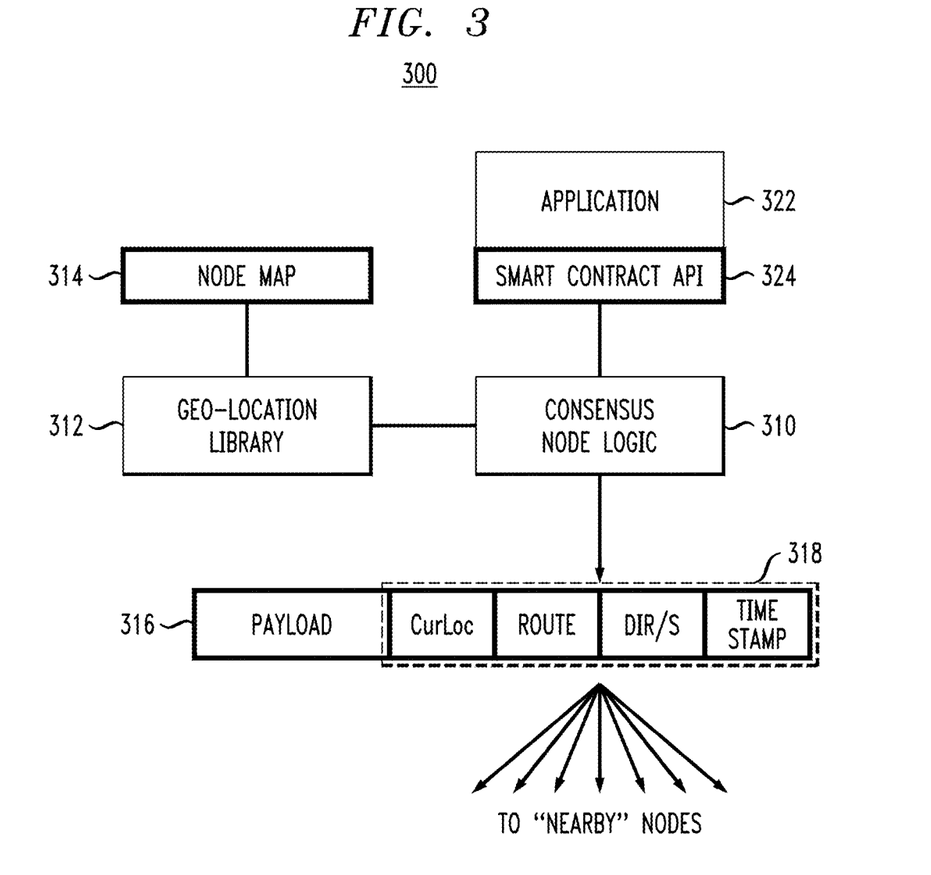
FIG. 3 illustrates geographic location features added to a given consensus node in a highly distributed system according to an illustrative embodiment.

For example, FIG. 3 illustrates geographic location features added to a given consensus node 300 in a highly distributed system according to an illustrative embodiment. More particularly, in illustrative embodiments, consensus nodes 210-2 through 210-N in FIG. 2 each employ the architecture of consensus node 300.

As shown, consensus node 300 comprises consensus node logic 310, a geographic location (geo-location) library 312, and a node map 314. While geo-location library 312 and node map 314 are shown as co-located with consensus node logic 310, in some alternative embodiments, one or more of geo-location library 312 and node map 314 are located remote from, but accessible to, the consensus node logic 310. The consensus node logic 314 generates a transaction with payload 316 as will be further explained below.

More particularly, as shown in FIG. 3, an application 322 calls a smart contract API 324 in a smart contract layer, and the smart contract layer creates a transaction payload and provides the transaction payload to consensus node logic 310 which is configured to be a part of the consensus protocol. Typically, a consensus protocol has its own static list of peer consensus nodes and broadcasts the proposed transaction to these consensus nodes. However, in accordance with illustrative embodiments, consensus node logic 310 first makes a call to retrieve geographic location information 318 from geo-location library 312 which is maintained in accordance with node map 314. The geographic location information 318 is appended to the transaction payload 316 by the consensus node logic 310.

A variety of different geographic location information can be returned from geo-location library 312 about the local node, i.e., consensus node 300 in this example. In one illustrative environment, the geographic location information 318 pertaining to consensus node 300 comprises:

Current actual geographic location information such as current geographic coordinates ("CurLoc") of the MCP (i.e., consensus node 300). In one or more illustrative embodiments, the geographic coordinates are obtained from a global positioning system (GPS).

Information used to derive predicted geographic location such as the detailed route ("Route") currently being traveled by the MCP (e.g., Waze or trip plan), and the direction and/or speed currently being traveled ("DIR/S") by the MCP.

The time stamp of when the above information was captured ("Time Stamp").

Note that geographic location information can contain more information or less information than listed above including other types of information.

Note that stationary nodes (e.g., sensors located at traffic lights or stop signs) can indicate that they are stationary and do not travel routes or go in specific directions and certain speeds.

Another function performed by geo-location library 312 is to create a list of consensus nodes to contact based on at least a subset of actual geographic location such as current geographic location (CurLoc) and/or last known geographic location, route (Route), and direction/speed (DIR/S) of the other consensus nodes in the network. For example, if 100 cars (with MCPs) were part of the consensus network one minute ago, this state is captured in node map 314. Geo-location library 312 estimates whether or not these devices are likely to still be in reach, based on their last known location and their speed and/or route/direction. Once geo-location library 312 generates a subset of consensus nodes that are likely to be in reach, this list is shared back to consensus node logic 310.

Note again that the consensus network, in some embodiments, has a node map and a geo-location library that two or more consensus nodes access, while in other embodiments, a node map and a geo-location library reside with each consensus node.

Advantageously, the consensus node 300 can now append local geographic location information 318 to the payload 316 and send the consensus request to the list of predicted "nearby" consensus nodes generated by geo-location library 312. Note that while the list is likely a subset of consensus nodes in the network due to the unavailability of one or more consensus nodes, in some cases, the list includes all the consensus nodes in the network when all consensus nodes are predicted to be available.

Furthermore, in illustrative embodiments, as consensus nodes receive requests and respond, every local consensus node updates its own copy of node map 314 to create an up-to-date view of consensus node locations in the consensus network.

Additionally, new nodes that enter into range and participate in the receipt of consensus chatter (e.g., User Datagram Protocol (UDP) messages) are added into the consensus network by sharing their own geographic location information 318 with the other consensus nodes of the network.

Still further, in some embodiments, applications that call smart contract logic (e.g., application 322 and smart contract API 324) are also given access (either directly or via an API) to the consensus node map. For example, in one illustrative embodiment in the context of FIG. 3, consensus node logic 310 provides application 322 with access to node map 314 through API 324. This allows applications to piggy-back their applications on top of the current consensus network.

Figure 4A:
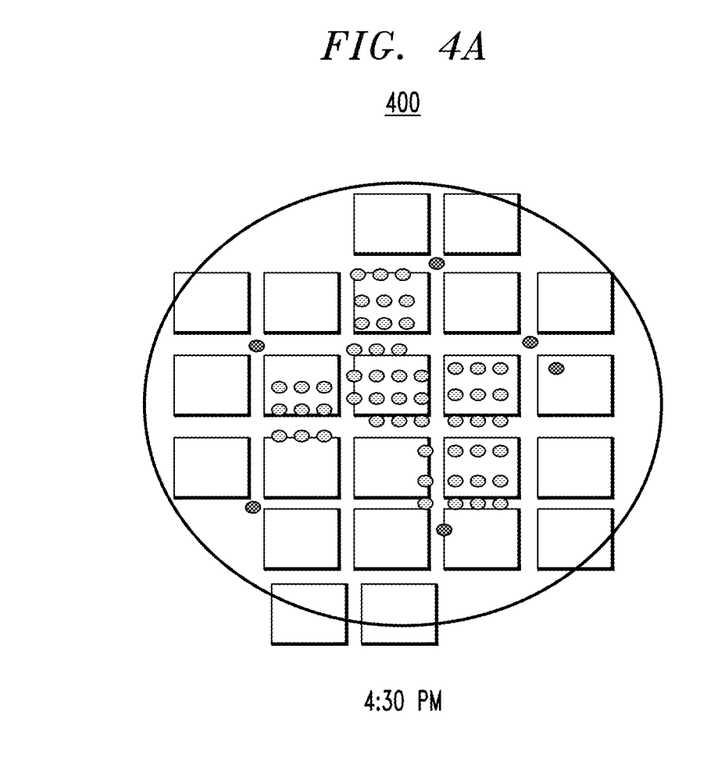
FIGS. 4A and 4B illustrate a reduction in consensus nodes over time in a highly distributed system according to an illustrative embodiment.
Figure 4B:
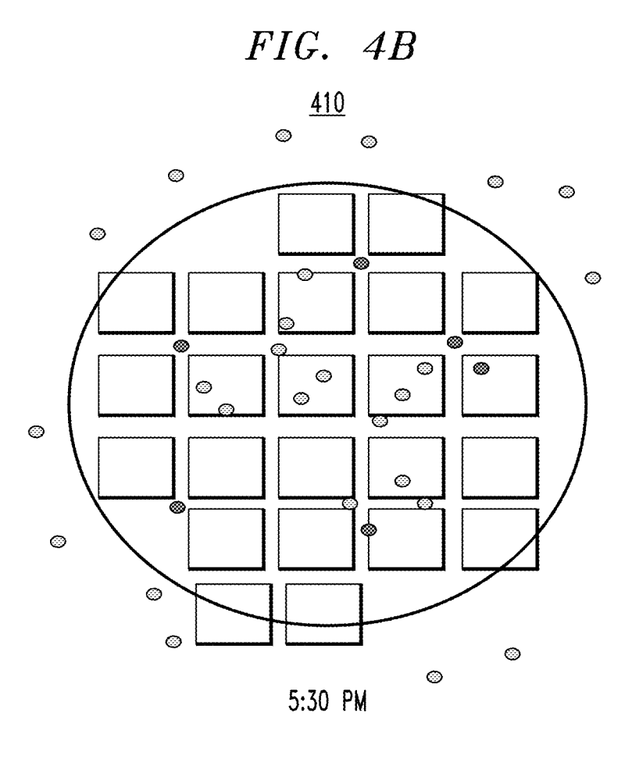

In illustrative embodiments, once application 322 has access to consensus node map 314, application 322 determines the relative strength of the consensus network to alter its data protection policies. FIGS. 4A and 4B highlight an example of two dynamic consensus networks. Consensus network 400 (FIG. 4A) is at 4:30 PM and reflects a set of cars (consensus nodes with MCPs) congregated around a parking area in the center of a town (light grey dots) with a set of static consensus nodes (black dots) located in set locations. These consensus nodes together form one consensus network (denoted by the circle surrounding the dots) and can send validation messages to one another. Consensus network 410 (FIG. 4B) is at 5:30 PM and, as shown, most of the MCPs (light grey dots) have traveled out of range (e.g., outside the circle denoting the consensus network) perhaps commuting home or otherwise leaving the area. This results in a much sparser set of consensus nodes (within the circle) over which a data protection application must manage to make sure that data is protected according to a given policy.

Figure 5:
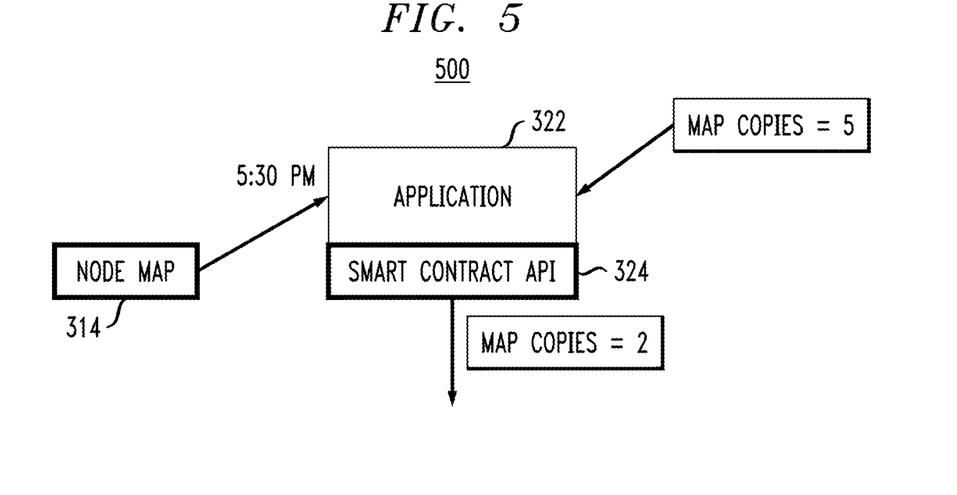
FIG. 5 illustrates a data policy change process based on a consensus node map according to an illustrative embodiment.

That is, in an illustrative embodiment, an application that operates in conjunction with the two configurations in FIGS. 4A and 4B may be implementing a set of data protection policies that are no longer achievable based on the lack of computing resources that are present at 5:30 PM in the network. For example, as illustrated in example 500 in FIG. 5, application 322 is tasked with keeping five local copies of a navigation map within a certain region but has to downgrade that policy to only two copies. FIG. 5 highlights the downgrade of this policy based on the current node map configuration at 5:30 PM (FIG. 4B). The application and consensus nodes are augmented by the usage of time stamps (see geographic location information 318 in FIG. 3) to predict when consensus nodes will move out of range or become inaccessible.

Even though each MCP may only be storing a fraction of a download, the applications that are accessing that file may desire to access the entire download.

In U.S. Ser. No. 15/898,443, filed on Feb. 17, 2018 and entitled "Ad-Hoc Mobile Computing," the disclosure of which is incorporated by reference herein in its entirety, an architecture is described in which "nearby" mobile compute platforms can be combined to form a "computer" in which the CPUs, memory, network, and storage are built-up/torn-down to perform compute tasks. Such architecture could create a full "virtual download" and quickly access missing chunks by paging them in from other MCPs.

In one illustrative use case, it is assumed that connected cars attempt to achieve autonomous driving via the frequent download of dynamic maps. The decentralized data management framework with geographic location features described herein can be applied to greatly assist in frequent dynamic map download.

Figure 6:
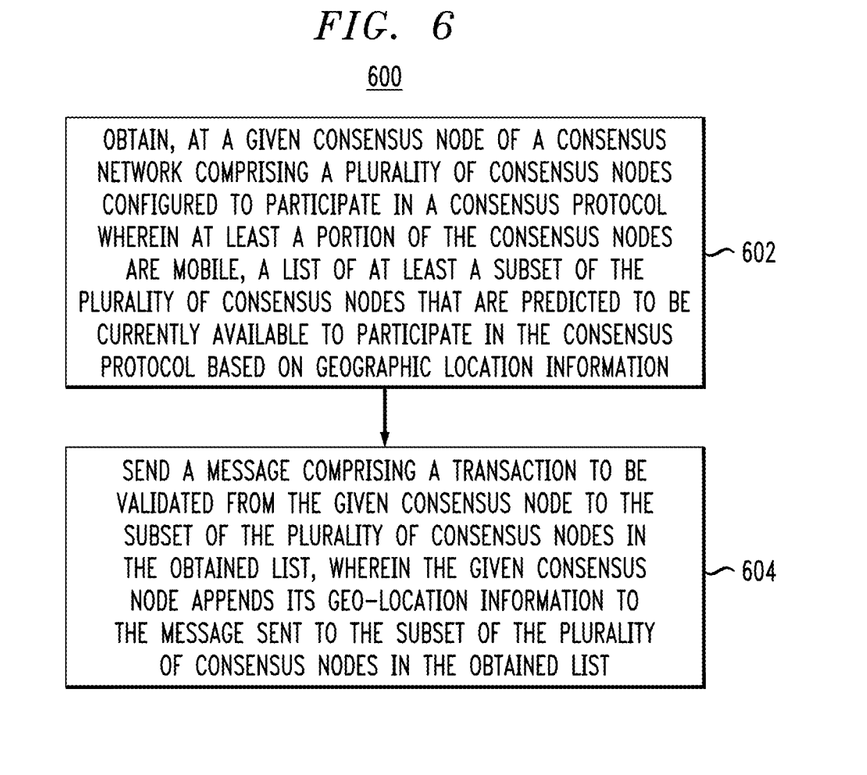
FIG. 6 illustrates a methodology for decentralized management of data associated with a highly distributed system using a geographic location-based consensus protocol according to an illustrative embodiment.

Given the illustrative description of decentralized data management techniques using a geographic location-based consensus protocol described herein, methodology 600 comprises the following steps.

In step 602, at a given consensus node of a consensus network comprising a plurality of consensus nodes configured to participate in a consensus protocol wherein at least a portion of the consensus nodes are mobile, a list is obtained of at least a subset of the plurality of consensus nodes that are predicted to be currently available to participate in the consensus protocol based on geographic location information.

In step 604, a message comprising a transaction to be validated is sent from the given consensus node to the subset of the plurality of consensus nodes in the obtained list.

At least portions of the system for decentralized data management using a geographic location-based consensus protocol shown in FIGS. 1-6 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 7.

As is apparent from the above, one or more of the processing modules or other components of the system for decentralized data management using a geographic location-based consensus protocol shown in FIGS. 1-6 may each run on a computer, server, storage device or other processing platform element. A given such element may be viewed as an example of what is more generally referred to herein as a "processing device." An example of such a processing platform is processing platform 700 shown in FIG. 7.

Figure 7:
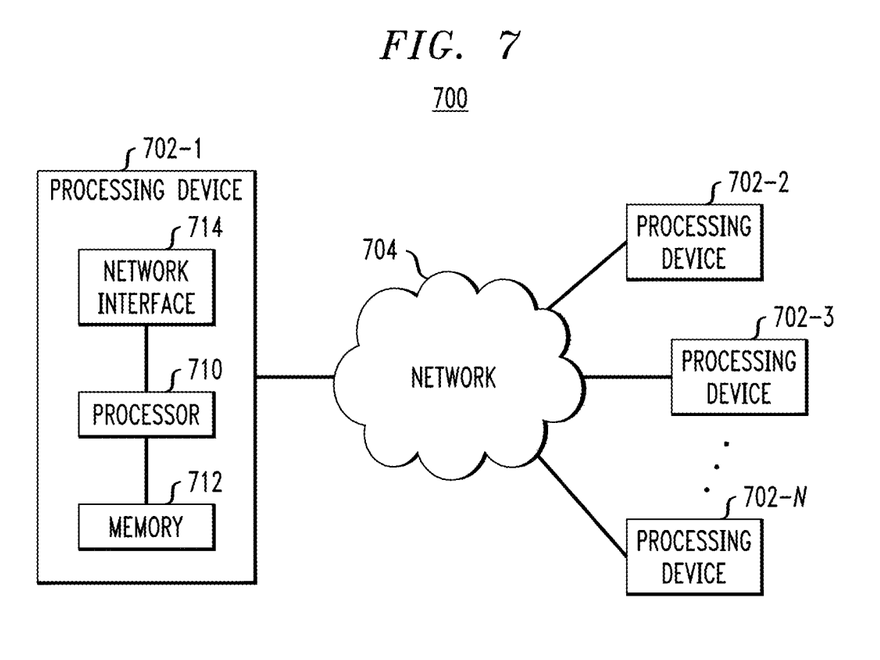
FIG. 7 illustrates a processing platform used to implement a highly distributed system with decentralized data management using a geographic location-based consensus protocol according to an illustrative embodiment.

The processing platform 700 in this embodiment comprises a plurality of processing devices, denoted 702-1, 702-2, 702-3, . . . , 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniB and, Gigabit Ethernet or Fibre Channel.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 of the example embodiment of FIG. 7 is network interface circuitry 714, which is used to interface the processing device with the network 704 and other system components and may comprise conventional transceivers.

The other processing devices 702 of the processing platform 700 are assumed to be configured in a manner similar to that shown for processing device 702-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for decentralized data management, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for decentralized data management using a geographic location-based consensus protocol. Such components can communicate with other elements of the system over any type of network or other communication media.

As indicated previously, in some embodiments, components of the system for decentralized data management using a geographic location-based consensus protocol as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for decentralized data management using a geographic location-based consensus protocol. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
    obtaining, at a given consensus node of a consensus network comprising a plurality of consensus nodes configured to participate in a consensus protocol wherein at least a portion of the consensus nodes are mobile, a list of at least a subset of the plurality of consensus nodes that are predicted to be available to participate in the consensus protocol based on geographic location information;
    sending a message comprising a transaction to be validated from the given consensus node to the subset of the plurality of consensus nodes in the obtained list;
    maintaining, at the given consensus node, a consensus node map identifying geographic locations of the consensus nodes in the consensus network such that the consensus node map is consulted to generate the list of at least a subset of the plurality of consensus nodes that are predicted to be available to participate in the consensus protocol; and implementing, at the given consensus node, at least a portion of a data protection policy associated with the consensus network and configured to be adjustable based on a number of consensus nodes that are predicted to be available in the consensus network;

wherein the given consensus node comprises a geo-location library module and the consensus node map;

wherein the geo-location library module is configured to generate the list of at least a subset of the plurality of consensus nodes that are predicted to be available to participate in the consensus protocol at a given time;

wherein the list includes at least a first consensus node in the consensus network prior to the given time and at least a second consensus node outside of the consensus network prior to the given time;

wherein the geo-location library module is configured to determine whether the at least a second consensus node will be within the consensus network based on at least one of a prior known location, a speed of travel or a direction of travel of the at least second consensus node relative to a geographical location of the consensus network; and wherein the method is implemented via at least one processing device comprising a processor coupled to a memory.

2. The method of claim 1, further comprising the given consensus node appending its geographic location information to the message sent to the subset of the plurality of consensus nodes in the obtained list.

3. The method of claim 1, wherein the geographic location information comprises geographic coordinates associated with the given consensus node.

4. The method of claim 3, wherein the geographic location information further comprises information identifying a route the given consensus node is traveling.

5. The method of claim 3, wherein the geographic location information further comprises information identifying a direction and a speed at which the given consensus node is traveling.

6. The method of claim 3, wherein the geographic location information further comprises information identifying a time at which the geographic location information was captured.

7. The method of claim 1, wherein the given consensus node maintains the consensus node map based on geographic location information in one or more messages received from one or more other consensus nodes in the consensus network.

8. The method of claim 7, wherein the one or more other consensus nodes in the consensus network from which the one or more messages are received at the given consensus node comprise at least one of an existing consensus node in the consensus network and a consensus node that recently joined the consensus network.

9. The method of claim 7, wherein the given consensus node has an application program associated therewith such that the application program is given access to the consensus node map of the consensus network.

10. The method of claim 9, wherein the application program is configured to alter the data protection policy based on a current state of the consensus network determined from the consensus node map.

11. The method of claim 10, wherein the application program one of upgrades and downgrades the data protection policy based on the number of consensus nodes that are predicted to be available in the consensus network.

12. The method of claim 1, wherein the plurality of consensus nodes operates in a system environment maintaining a first decentralized messaging network of interconnected messaging nodes and a second decentralized data network of interconnected data nodes, wherein each of at least a subset of the consensus nodes is associated with one or more of a given messaging node and a given data node;

wherein the first decentralized messaging network is different from the second decentralized data network.

13. An article of manufacture comprising a non-transitory processor-readable storage medium having stored therein program code of one or more software programs, wherein the program code when executed by at least one processing device causes the at least one processing device to perform the steps of claim 1.

14. An apparatus comprising:

at least one processing device comprising a processor coupled to a memory configured to form a given consensus node of a consensus network comprising a plurality of consensus nodes configured to participate in a consensus protocol wherein at least a portion of the consensus nodes are mobile, the given consensus node configured to:

obtain a list of at least a subset of the plurality of consensus nodes that are predicted to be available to participate in the consensus protocol based on geographic location information;

send a message comprising a transaction to be validated from the given consensus node to the subset of the plurality of consensus nodes in the obtained list maintain, at the given consensus node, a consensus node map identifying geographic locations of the consensus nodes in the consensus network such that the consensus node map is consulted to generate the list of at least a subset of the plurality of consensus nodes that are predicted to be available to participate in the consensus protocol; and implement, at the given consensus node, at least a portion of a data protection policy associated with the consensus network and configured to be adjustable based on a number of consensus nodes that are predicted to be available in the consensus network;

wherein the given consensus node comprises a geo-location library module and the consensus node map;

wherein the geo-location library module is configured to generate the list of at least a subset of the plurality of consensus nodes that are predicted to be available to participate in the consensus protocol at a given time;

wherein the list includes at least a first consensus node in the consensus network prior to the given time and at least a second consensus node outside of the consensus network prior to the given time; and wherein the geo-location library module is configured to determine whether the at least a second consensus node will be within the consensus network based on at least one of a prior known location, a speed of travel or a direction of travel of the at least second consensus node relative to a geographical location of the consensus network.

15. The apparatus of claim 14, wherein the given consensus node is further configured to append its geographic location information to the message sent to the subset of the plurality of consensus nodes in the obtained list.

16. The apparatus of claim 14, wherein the geographic location information comprises geographic coordinates associated with the given consensus node and information identifying one or more of: a route the given consensus node is traveling, a direction which the given consensus node is traveling, and a speed at which the given consensus node is traveling.

17. A method comprising:
obtaining, at a given computing node of a computing network comprising a plurality of computing nodes configured to participate in a data protection policy wherein at least a portion of the computing nodes are mobile, a list of at least a subset of the plurality of computing nodes that are predicted to be available to participate in the data protection policy;
selecting the data protection policy;
maintaining, at the given computing node, a node map identifying geographic locations of the computing nodes in the computing network such that the node map is consulted to generate the list of at least a subset of the plurality of computing nodes that are predicted to be available to participate in the data protection policy; and
implementing, at the given computing node, at least a portion of the data protection policy associated with the computing network and configured to be adjustable based on a number of computing nodes that are predicted to be available in the computing network;
wherein the given computing node comprises a geo-location library module and the node map;
wherein the geo-location library module is configured to generate the list of at least a subset of the plurality of computing nodes that are predicted to be available to participate in the data protection policy at a given time;
wherein the list includes at least a first computing node in the computing network prior to the given time and at least a second computing node outside of the computing network prior to the given time;
wherein the geo-location library module is configured to determine whether the at least a second computing node will be within the computing network based on at least one of a prior known location, a speed of travel or a direction of travel of the at least second computing node relative to a geographical location of the computing network; and
wherein the method is implemented via at least one processing device comprising a processor coupled to a memory.

18. The method of claim 17, wherein the selected data protection policy is one of upgraded and downgraded as the number of available computing nodes changes.

19. The method of claim 1 wherein each of the consensus nodes comprises the geo-location library module and the consensus node map.

20. The apparatus of claim 14 further wherein each of the consensus nodes comprises the geo-location library module and the consensus node map.

* * * * *